United States Patent [19]

Townsend

[11] Patent Number: 4,940,282

[45] Date of Patent: Jul. 10, 1990

[54] CHASSIS FRAME FOR A WHEELED MOTOR VEHICLE

[76] Inventor: John A. Townsend, P.O. Box 1518, Pacifica, Calif. 94044

[21] Appl. No.: 303,447

[22] Filed: Jan. 27, 1989

Related U.S. Application Data

[63] Continuation-in-part of Ser. No. 49,001, May 7, 1987, Pat. No. 4,801,172, which is a continuation of Ser. No. 783,837, Oct. 3, 1985, abandoned.

[51] Int. Cl.⁵ .................... B60J 5/06; B62D 23/00
[52] U.S. Cl. .................... 296/204; 296/188; 296/155
[58] Field of Search ............. 296/146, 155, 202, 188, 296/204, 205, 207; 49/40; 280/798

[56] References Cited

U.S. PATENT DOCUMENTS

| | | | |
|---|---|---|---|
| 1,940,444 | 12/1933 | Burgman | 49/40 |
| 2,100,561 | 11/1937 | Kliesrath | 280/798 |
| 2,160,099 | 5/1939 | Zeligman et al. | 49/40 |
| 2,622,919 | 12/1952 | Scott | 296/155 |
| 2,651,541 | 9/1953 | Surles | 296/155 |
| 2,785,921 | 3/1957 | Barenyi | 296/188 |
| 2,819,114 | 1/1958 | Lake | 296/155 |
| 3,567,209 | 3/1971 | Lathers | 296/106 X |
| 3,645,043 | 2/1972 | Velavicius et al. | 49/106 X |
| 3,887,227 | 6/1975 | Deckert | 296/188 |
| 4,090,734 | 5/1978 | Inami et al. | 296/146 |
| 4,415,195 | 11/1983 | Furukawa | 296/146 |
| 4,801,172 | 1/1989 | Townsend | 296/155 |

FOREIGN PATENT DOCUMENTS

| | | | |
|---|---|---|---|
| 895409 | 9/1953 | Fed. Rep. of Germany | 296/155 |
| 961405 | 5/1950 | France | 296/155 |
| 1013189 | 7/1952 | France | 296/155 |
| 1026247 | 4/1953 | France | 296/155 |
| 73938 | 10/1960 | France | 296/216 |
| 2478718 | 9/1981 | France | 296/155 |
| 613307 | 12/1960 | Italy | 296/155 |
| 225087 | 4/1983 | Switzerland | 296/155 |
| 242592 | 6/1926 | United Kingdom | 296/207 |
| 1085891 | 10/1967 | United Kingdom | 296/155 |
| 1592155 | 7/1981 | United Kingdom | 296/155 |

Primary Examiner—Dennis H. Pedder
Attorney, Agent, or Firm—Limbach, Limbach & Sutton

[57] ABSTRACT

A chassis frame is provided with a reinforced floor section and barrier sections fixed to the floor section in longitudinally spaced relationship to one another. Door openings are formed between the barrier sections to either side of the frame. The floor section is of a reduced width and the barrier sections include outwardly convex curvilinear side portions extending laterally relative to the floor section. Door panels are carried by the side portions for slidable movement relative thereto in a curvilinear path defined by the shape of the side portions between extended positions bridging the door openings and retracted positions stowed beneath the floor section. The door panels are tension, compression and torsion resistant and, when in the extended positions, mutually engage the floor section and the sides of the door openings to impart rigidity to the frame.

16 Claims, 3 Drawing Sheets

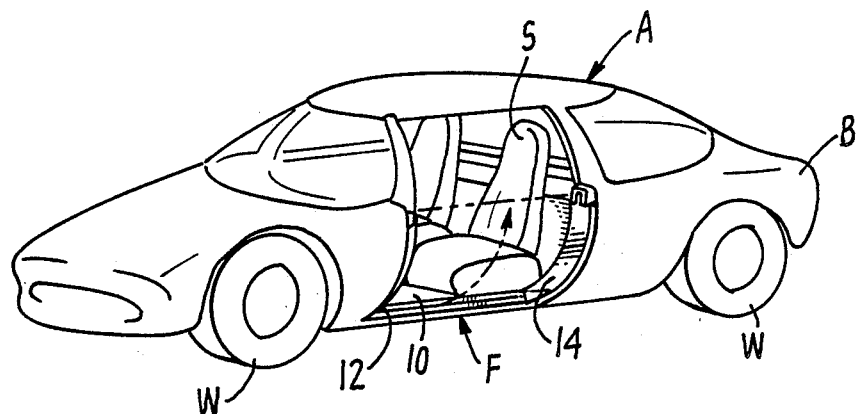
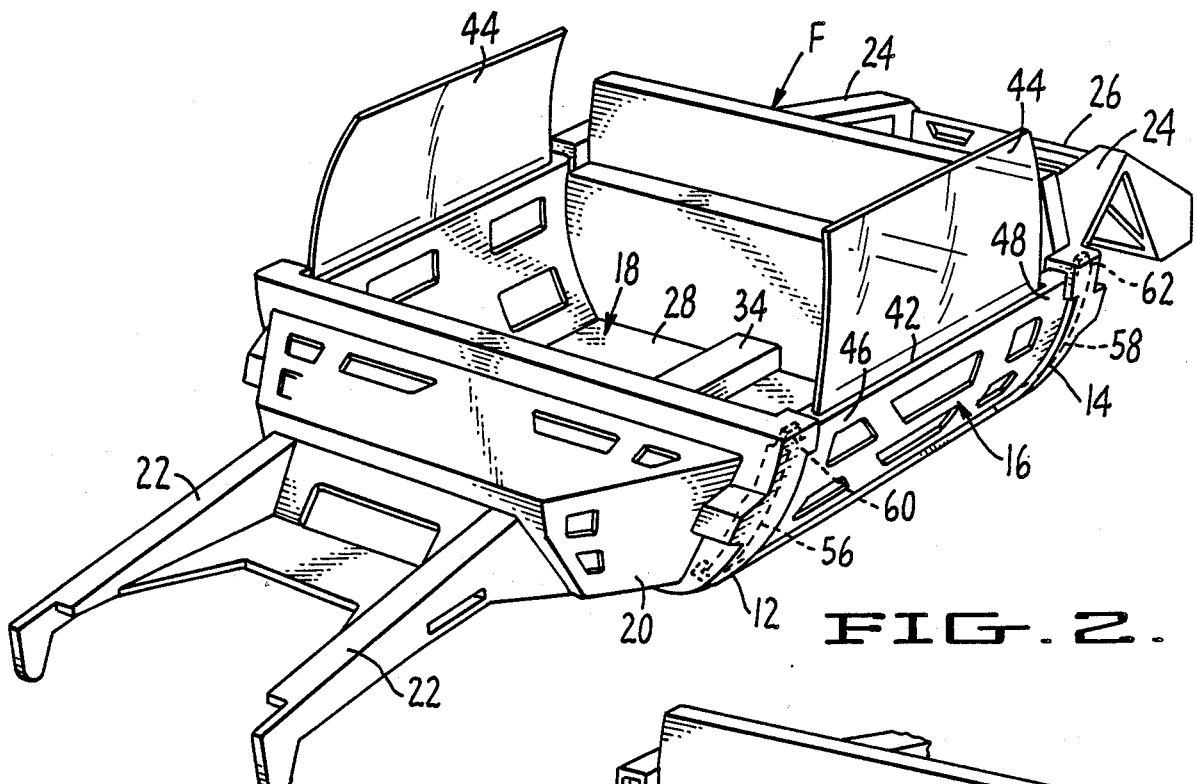
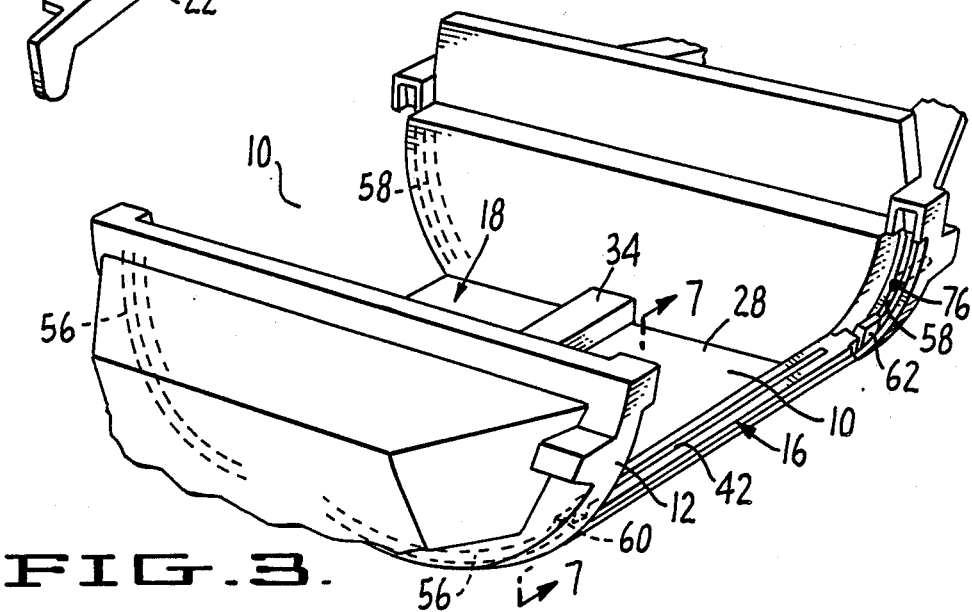

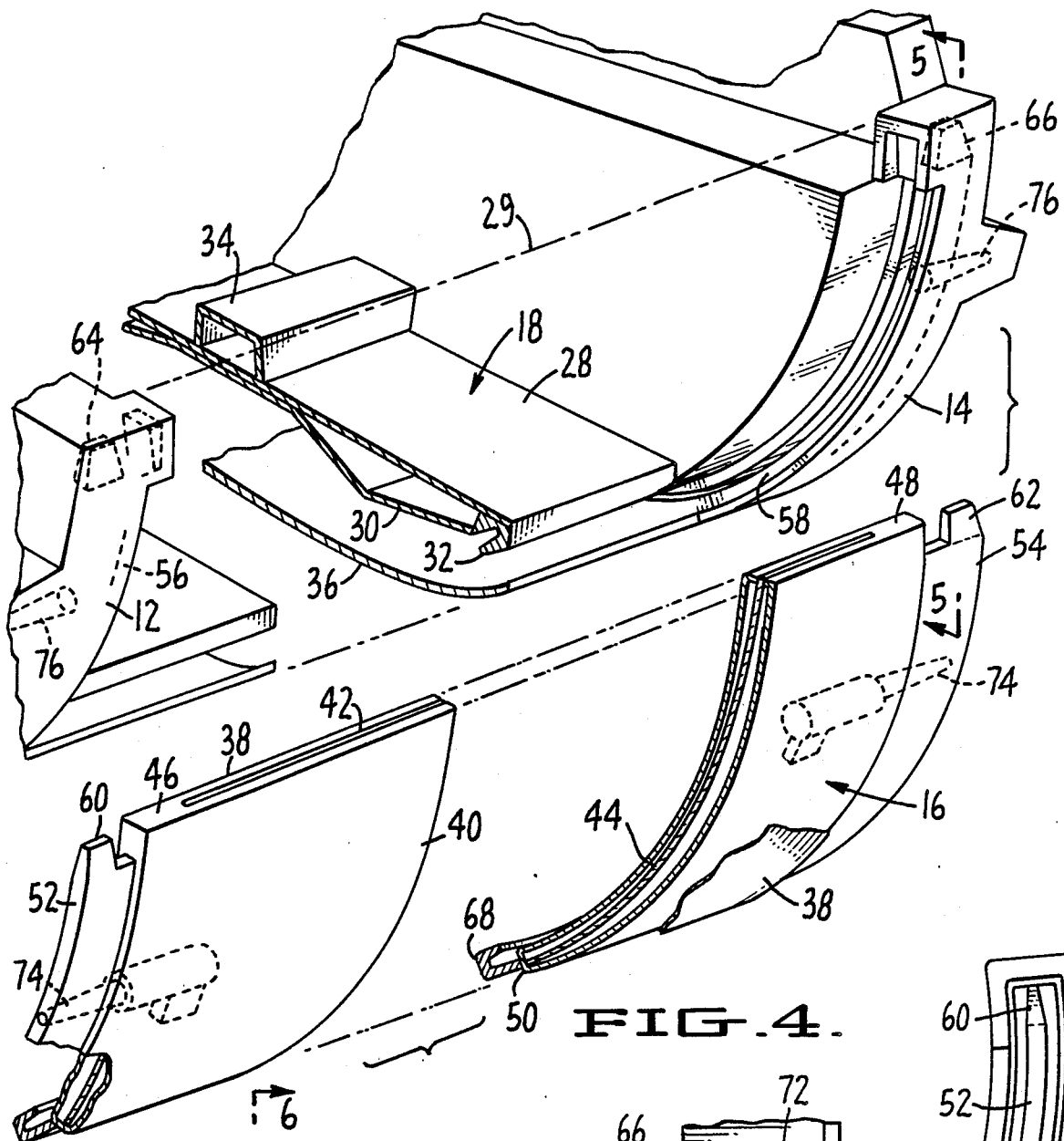

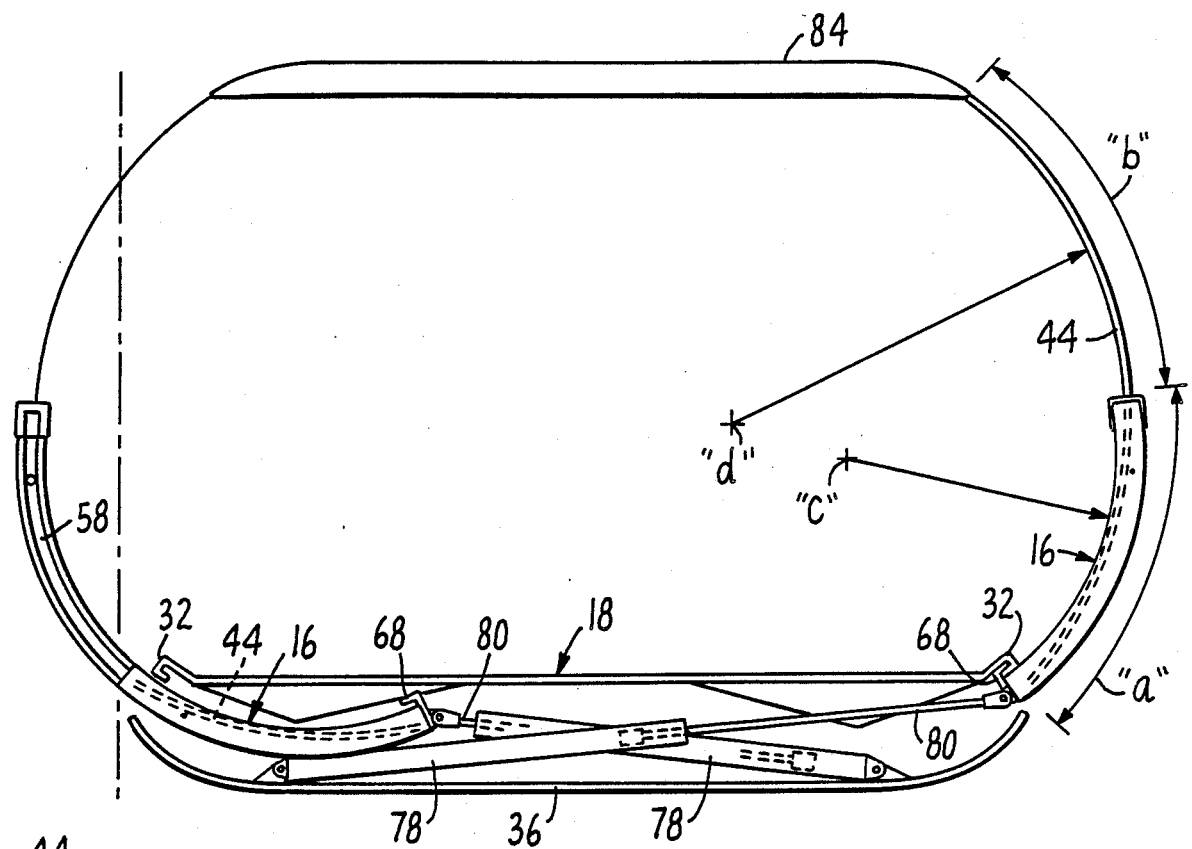
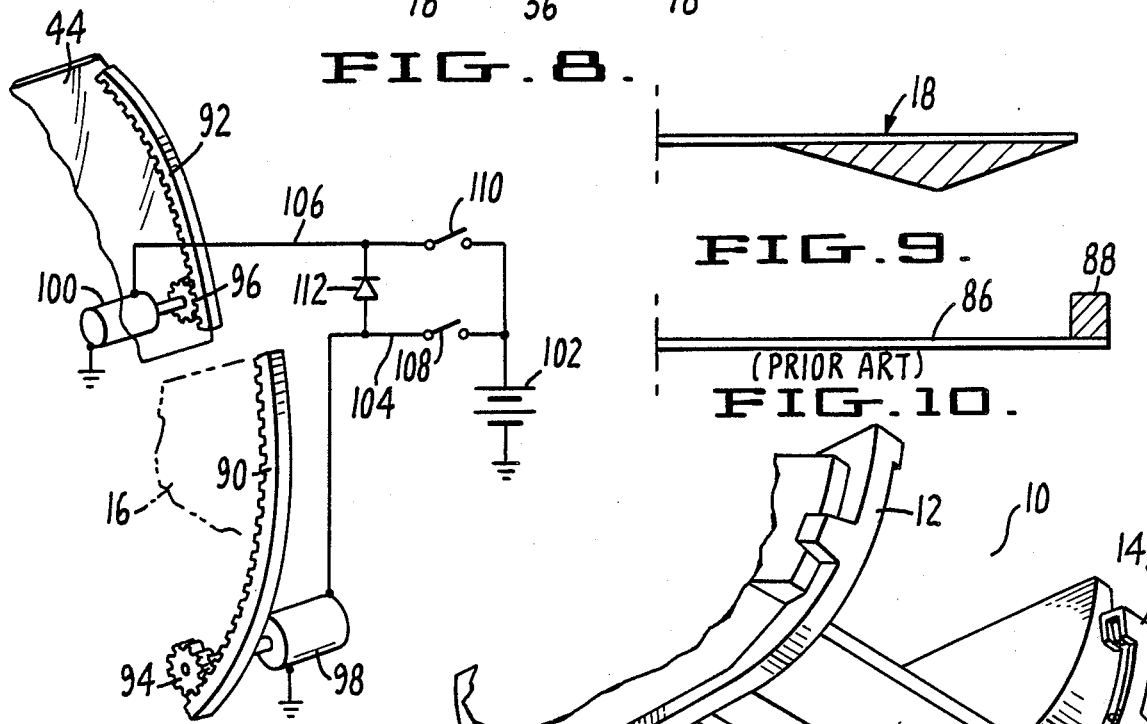
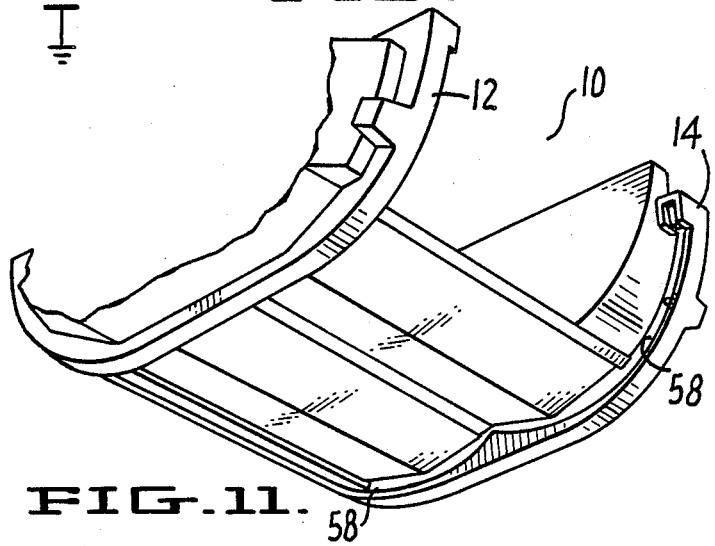

CHASSIS FRAME FOR A WHEELED MOTOR VEHICLE

RELATED APPLICATION

This is a continuation-in-part of copending parent application Ser. No. 049,001, filed May 7, 1987, now U.S. Pat. No. 4,801,172; which parent application in turn was a continuation of application Ser. No. 783,837, filed Oct. 3, 1985, now abandoned.

BACKGROUND OF THE INVENTION

The present invention relates to a vehicle chassis frame with door openings having closure panels which become part of the frame when closed. In its more particular aspects, the invention is concerned with a frame construction wherein barrier sections of the frame extend upwardly to either side of the door openings and the door panels move within the confines of the frame between retracted positions beneath the floor of the frame and closed positions engaged between the barrier sections to impart tensile, compressive and torsional rigidity to the frame.

The invention is also concerned with an improved chassis frame for wheeled motor vehicles which provides a floor section between the door openings of a width significantly less than the width of the vehicle. The mid-portion of floor section is of an expanded vertical cross-section to impart rigidity to the frame and the edge portions of the frame are of a narrow vertical cross-section to accommodate the passage of rotatively mounted doors beneath the floor section.

In the prior art it is well known to provide vehicle chassis with door panels which move through a generally arcuate path between a stowed condition beneath the floor of the vehicle and a closed condition in a door opening. These door panels are generally of relatively conventional construction and do not cooperate with frame members of the vehicle chassis to impart significant torsional or compressive rigidity to the chassis. In some instances, the door panels are highly flexible and of a segmented or accordion-like structure which is incapable of sustaining torsional loads. In most instances, the door panels have been provided for closure purposes only and engage the body of the vehicle only for purposes of their own support and to affect a secure closure.

The prior art also teaches providing vehicles with conventional swinging door panels having latch structures which hold the panels in compression when closed and longitudinal beams which reinforce the panels against lateral impact. Although such door panels necessarily provide some reinforcement to the vehicle chassis, they do not provide frame structure which adds significantly to the torsional rigidity of the chassis by essentially eliminating the void in the chassis provided by the door opening.

Prior art vehicle chassis frames generally have relatively thick sills beneath the door openings. These sills serve as principal frame members and are spaced apart laterally of the chassis frame to the greatest extent permitted by the aesthetic design constraints of the vehicle. In some instances, particularly with convertible-type vehicles which do not have top structure, the sills comprise very deep frame structures which provide a substantial part of the torsional rigidity of the chassis frame.

SUMMARY OF THE INVENTION

The chassis frame of the invention is provided with an elongate floor section of a reduced width as compared to that of the vehicle. Upstanding barrier sections are fixed to and extend upwardly from the floor section in longitudinally spaced relationship to one another to provide door openings on either side of the frame. The floor section has a longitudinally extending mid-portion of an expanded vertical cross-section to impart rigidity to the frame and longitudinally extending edge portions of a narrow vertical cross-section. Stress members are extensible across the door openings and into engagement with the barrier sections to impart additional rigidity to the frame. In the preferred embodiment, the stress members are provided by tension, compression and torsion-resistant door panels which are moveable in a curvilinear path between elevated positions extending across the openings and retracted positions stowed beneath the floor section.

The chassis frame is ideally suited for monocoque or spaceframe type construction. It may be fabricated of steel pressings, steel tubes, aluminum or thermoplastics plastics (e.g. Kevlar). It may be of a unitary construction having outer body panels forming part of the load-bearing structure, or of a monocoque or spaceframe construction with attached non-load-bearing body panels. In the latter case, the body panels could be of a similar material to that of the frame, or of a differing material, such as a polymer.

A principal object of the present invention is to provide a vehicle chassis frame for a motor vehicle which is more efficient from a stress viewpoint and may therefore be lighter in overall weight than conventional designs of similar material and construction type.

Another object of the invention is to provide such a frame having side door panels which when closed serve as fully stressed frame members and have a height equal to that of the scuttle and rear trunk.

A further object related to the latter object is to provide such a frame which does not have to rely upon the contribution of the vehicle roof structure for support and may, as a result, be used without significant alteration for sedan, coupe or convertible versions of a given automobile.

Still another object related to the latter object is to provide such a frame wherein the design of the roof in the case of coupes and sedans may be explored to the full, unfettered by the structural restraints which are present when the roof structure must be relied upon as a stress member of the frame.

Yet a further object of the invention is to provide a frame which enables a greater upper tumblehome (the amount by which the side windows curve inward toward the center of the roof), as well as a greater lower tumblehome (curvature of the lower flanks of the vehicle towards the center line of the floor).

Another object of the invention related to the greater lower tumblehome is to provide a vehicle chassis with a narrow floor which facilitates ingress and egress to the interior of the vehicle.

Other objects of the invention are to provide a chassis and door panel structure wherein the side window may be of a height greater than the depth of the door panel and the length of the door panel is not limited by the constraints necessarily imposed if the panel is to swing outwardly.

Still another and more general object of the invention is to provide a chassis frame wherein when closed the door panels become load supporting and essentially eliminate the door openings from a structural standpoint.

The foregoing and other objects will become more apparent when viewed in light of the accompanying drawings and following detailed description.

BRIEF DESCRIPTION OF THE DRAWINGS

FIG. 1 is a perspective view of an automobile embodying the chassis frame of the invention, with the side door panel facing the viewer shown in a retracted open condition;

FIG. 2 is a perspective view of a monocoque form of a chassis frame embodying the invention, with the door panels of the frame shown in the elevated closed condition;

FIG. 3 is a cross-sectional perspective view similar to FIG. 2, with parts thereof broken away, illustrating the frame with the door panels in the retracted open condition;

FIG. 4 is an exploded perspective view of the frame shown in FIGS. 2 and 3, with parts thereof broken away and shown in section.

FIG. 5 is a cross-sectional elevational view taken on the plane designated by line 5—5 of FIG. 4;

FIG. 6 is a cross-sectional elevational view taken on the plane designated by line 6—6 of FIG. 5;

FIG. 7 is a cross-sectional elevational view taken on the plane designated by line 7—7 of FIG. 3;

FIG. 7A is a cross-sectional view taken on the plane designated by line 7A—7A of FIG. 7;

FIG. 8 is a transverse cross-sectional view through approximately the center of an automobile of the type shown in FIG. 1;

FIG. 9 is a diagrammatic transverse cross-sectional view of a vehicle floor, showing how reinforcement is achieved through the construction of the present invention;

FIG. 10 is a diagrammatic transverse cross-sectional view of a vehicle floor, showing how reinforcement is achieved in prior art constructions using conventional door sills;

FIG. 11 is a perspective bottom view of a chassis frame constructed according to the present invention, with parts thereof broken away to show the construction of the floor section of the frame; and, FIG. 12 is a diagrammatic view illustrating drive structure which may be used to raise and lower the door panels and windows embodied in the structure of the present invention.

DESCRIPTION OF THE PREFERRED EMBODIMENT

The automobile shown in FIG. 1 is designated in its entirety by the letter "A" and comprises a frame "F" constructed according to the present invention and supported on wheels "W" through suitable suspension structure (not illustrated). The automobile has body structure "B" supported on the frame. Seats "S" are supported on the floor section of the frame. Door openings 10 are formed through the sides of the body structure "B" and, as will be more apparent from the following description, bounded by upstanding front and rear barrier sections 12 and 14, respectively, forming part of the frame.

Door panels 16 are slidably received between the barrier sections for movement between closed elevated positions extending across the openings 10 and retracted stowed positions disposed beneath the floor of the automobile. The dashed arrow line in FIG. 1 depicts the path of movement for the door panel on the side of the automobile facing the viewer. The dashed line extending across the opening 10 in FIG. 1 depicts the uppermost edge of the door panel when in the fully elevated closed position.

FIG. 2 illustrates the frame "F" apart from the automobile body "B". As there seen, the barrier sections 12 and 14 extend transversely of the frame and are fixed to the floor section of the frame, designated 18. From FIG. 2 it will also be seen that the outside edges of the barrier sections 12 and 14 are convex and extend laterally outwardly relative to the floor section 18. The forward barrier section 12 includes a foot well section 20. Longitudinal frame members 22 are fixed to and extend forwardly from the section 20. The members 22 provide for suspension mounting and, in a front engined vehicle, may also provide for mounting of the engine. Frame members 24 are fixed to and extend rearwardly from the barrier section 14. The members 24 and a cross member 26 fixed thereto at their distal ends provides for suspension mounting and, if the automobile is powered by a centrally or rearwardly disposed engine, for mounting of the engine.

The floor section 18 provides the backbone of the frame and, as may be seen from FIG. 4, comprises: a top panel 28 of a horizontal generally planar configuration; a bottom panel 30 defining, together with the top panel 28, longitudinally extended box sections of a triangular configuration disposed to either side of the longitudinal center line of the frame, designated 29; longitudinally extending lateral channels 32 fixed between the lateral edges of the panels 28 and 30 and extending over the length of the floor; and, a tunnel section 34 fixed to the top panel 18 and the barrier sections 12 and 14. An underpan 36 extends beneath and in spaced relationship to the floor section 18 to provide a pocket for receipt of the door panels 16 when in the retracted condition. The underpan 36 is fixed to the barrier sections and extends beneath the full area of the floor section 18.

In the illustrated embodiment, the elements 12 through 36 are integrally joined to provide a monocoque construction. This provides an extremely rigid and torsion-resistant structure. The door panels 16, when in the elevated closed condition, become a part of this construction.

The door panels 16 are constructed so as to be rigid frame elements capable of sustaining loads in all directions including torsion, compression, tension, and lateral impact. As shown in FIG. 2, the skin is removed from the structural panels and lightening holes are shown formed in the panels. Such lightening holes also appear in the foot well section 20 of the frame. The remaining figures do not show such lightening holes. FIG. 4 shows skin 38 on the door panel 16.

Each door panel comprises inner and outer layers 38 and 40, respectively, spaced to define a pocket 42 for receipt of the window glass 44 received within the panel. The inner and outer layers 38 and 40 are secured in spaced relationship by forward and rearward edge portions 46 and 48, respectively, and a bottom edge portion 50; all of which edge portions, together with the inner and outer layers, form an integral part of the door panels 16. From FIGS. 2 and 4, it can be seen that the door panels 16 are of a generally arcuate configuration complemental in shape to the outside of the body structure "B" of the automobile "A". Tongues 52 and 54 extend from the forward and rearward portions 46 and 48, respectively, for slidable receipt within arcuate grooves 56 and 58 formed in the barrier sections 12 and 14, respectively. When so received within the grooves, the tongues serve to support the door panels 16 for slidable movement between the closed extended position shown in FIG. 2 and the retracted open position shown in FIG. 3. Protrusions 60 and 62 of a generally frusto-pyramidical shape are formed on and extend upwardly from the tongues 52 and 54, respectively, for complemental receipt within sockets 64 and 66 formed in the barrier sections 12 and 14, respectively, at the upper ends of the grooves 56, 58. A door channel 68 is fixed to and extends laterally across the bottom edge portion 50 of each door panel for complemental engagement within the floor channel 32 when the door panel is in the elevated closed position. The recess within the channel 32 is of a frusto-pyramidical configuration and the flange of the door channel 68 is of a frusto-pyramidical shape complemental thereto. The ends of the door channel 68 terminate short of the lateral edges of the panel in inclined surfaces 70 positioned to complementally engage mating inclined surfaces 72 on the barrier sections 12 and 14 when the door panels are in the elevated closed position (see FIG. 7A). Selectively extensible tapered pins 74 are carried by the door panels for extension laterally therefrom through the tongues 52 and 54 and into complemental engagement with tapered sockets 76 (See FIG. 5) formed in the barrier sections 12 and 14 in communication with the grooves 56 and 58 therein. The pins 74 may be actuated by any suitable means, such as solenoids with a spring return. When in the retracted condition shown in FIG. 5, the pins permit the unrestricted movement of the door panels. When the door panels are fully elevated to the closed position, extension of the pins into the sockets 76 functions to lock the panels against retraction.

Together, the complemental engagement of the various elements on the door panels 16 and barrier sections 12 and 14 serves as compression, tension and torsion transmitting means enabling the panel to serve as a frame member when in the elevated closed position. In that condition, the door panels effectively eliminate the door openings from the frame and provide a rigid unitary frame structure which is not dependent upon the roof of the vehicle for its structural integrity.

The cross-sectional view of FIG. 8 illustrates the manner in which the two door panels 16 may be operated through means of double-acting hydraulic cylinders 78 pivotally secured to the under pan 36 and having piston rods 80 pivotally secured to the bottom edge portions of the door panels. This figure also shows the arcs through which the door panels 16 and window glass 44 move. The arc for the door panel is designated by the letter "a" and the arc for the window glass is designated by the letter "b". The center of the axis of rotation for the door panel is designated "c" and the center of the axis of rotation for the window glass is designated "d".

From FIG. 8 it will also been seen that the window glass 44 seals against the roof 84 of the automobile body structure. The window glass may be raised and lowered when the doors are in the closed condition, much in the same manner as is conventional in existing automobiles. It also must be lowered when the door panels are retracted to assure that the window glass will not obstruct the door openings. Ideally this retraction is achieved automatically by means of power actuators which lower the windows upon actuation of the cylinders 78 to retract the door panels.

When viewed in comparison, it will be seen that the inventive floor section 18 shown in FIG. 9 is significantly narrower than the prior art floor section 86 shown in FIG. 10. This is a result of the requirement that the prior art section include a laterally disposed door sill 88. The narrower floor section of the present invention accommodates the rotatable door panels and also greatly facilitates ingress and egress from the automobile body. It is possible because the longitudinally reinforcements provided by the triangular floor sections of the invention enables the elimination of the conventional door sill.

FIG. 11 illustrates in greater detail the reinforcement of the floor section 12 provided by the triangular box sections. There it will also be seen that the grooves 56, 58 formed in the barrier sections extend around the triangular box sections so as to guide the door panels beneath these sections when retracted.

FIG. 12 diagrammatically illustrates an alternative actuator for the door panels 16 and a cooperating actuator for the window glass incorporated into the door panels. As there shown, arcuate gear racks 90 are fixed to the door panels 16 and arcuate gear racks 92 are fixed to the window glass 44. Pinions 94 and 96 are engaged with the gear racks and driven by electric motors 98 and 100, respectively. The motors are driven by a grounded battery 102 connected to the motors by parallel leads 104 and 106. Switches 108 and 110 in the leads provide means whereby either the door motor 98 or the window motor 100 may be selectively actuated. A diode 112 is connected between the leads 104 and 106 to pass power to the motor 100 to lower the window glass 44 whenever the door panel is lowered. This diode also blocks the flow of current from the lead 106 to the lead 104 when the switch 110 only is closed.

CONCLUSION

From the foregoing description, it will be seen that the invention enables the attainment of the objects initially set forth. It should be understood, however, that the invention is not intended to be limited to the specifics of the embodiment illustrated and described, but rather is defined by the accompanying claims.

I claim:

1. An improved chassis frame for a wheeled motor vehicle of a given maximum width, said frame comprising:
    (a) an elongate floor section of a width substantially less than the maximum width of the vehicle, said section having a central portion comprised of at least one lower longitudinally extending element of a box-like cross-section to impart rigidity to the frame, and said floor section defining longitudinally extending distal edge portions of said frame, said distal edge portions having a depth substantially less than the depth of the longitudinally extending elements of the central portion;
    (b) upstanding barrier sections fixed to and extending upwardly from said floor section in longitudinally spaced relationship to one another, said barrier sections defining therebetween door openings on either side of the frame and having outwardly convex curvilinear side portions extending laterally outwardly relative to the floor section; and
(c) a door complemental in shape to each of the curvilinear side portions of the barrier sections and proportioned for receipt in each of the door openings;
(d) means mounting said doors to the curvilinear side portions of the barrier sections for movement outwardly of the distal edge portions of the floor section between elevated positions extending across said openings and retracted positions stowed beneath the floor section of the frame;
(e) means to selectively move the doors between the elevated and retracted positions; and, said doors each comprising stress strut means to assume engagement with said barrier sections when the door is in the elevated position to impart rigidity to the frame.

2. A frame according to claim 1 wherein said barrier sections include portions fixed to and extending transversely across the floor section.

3. A frame according to claim 1 or 2 wherein said means mounting said doors comprise channels formed in the curvilinear side portions and tongues formed on the doors for slidable receipt within said channels.

4. A frame according to claim 1 wherein the frame has a longitudinal centerline and the floor section comprises two longitudinally extending box structures of substantially triangular cross-section; said structures being disposed, respectively, to either side of the longitudinal centerline of the frame and each being so disposed as to have a flat top surface and converging bottom surfaces.

5. A frame according to claim 4 wherein, upon movement to the retracted position, each door extends beneath the triangular structure to the side of the longitudinal centerline of the frame to which the door is disposed.

6. A frame according to claim 5 further comprising an underpan disposed in spaced relationship beneath the triangular structures and wherein upon movement to the retracted position each door extends between the underpan and the triangular structure to the side of the longitudinal centerline of the frame to which the door is disposed.

7. An improved chassis frame for a wheeled motor vehicle, said frame comprising:
(a) an elongate floor section extending over a portion of the length of the frame and defining the distal lateral edges of said portion;
(b) upstanding barrier sections fixed to and extending upwardly from said floor section in longitudinally spaced relationship to one another, said barrier sections defining therebetween door openings on either side of the frame and having outwardly convex curvilinear side portions extending laterally outwardly relative to the floor section; and,
(c) rigid tension, compression and torsion resistent door panels complemental in shape to the curvilinear side portions of the barrier sections and proportioned for receipt in the door openings;
(d) means mounting said door panels to the curvilinear side portions of the barrier sections for movement across a path outwardly of said distal lateral edges between elevated positions extending across said openings and retracted positions removed from said openings and stowed beneath the floor section of the frame;
(e) means to selectively move said door panels between the elevated and retracted positions; and,
(f) interengagable tension, compression and torsion transmitting means on said barrier sections and door panels for complemental engagement when the door panels are in the elevated positions whereby said door panels become a structurally integral part of the frame to impart rigidity to the frame.

8. A frame according to claim 7 wherein said barrier sections extend transversely across the floor section over the width of the floor section.

9. A frame according to claim 7 or 8 wherein said means mounting said door panels comprise channels formed in the curvilinear side portions and tongues formed on the door panels for slidable receipt within said channels.

10. A frame according to claim 7 or 8 wherein said tension, compression and torsion transmitting means comprises locking means to selectively lock the door panels in the elevated position.

11. A frame according to claim 10 wherein said locking means further comprises:
(a) pin sockets on the curvilinear side portions of the barriers sections, said sockets extending longitudinally of the frame and opening toward the door openings;
(b) selectively extensible pins on the door panels, each of said pens extending longitudinally of the frame for alignment with one of said pin sockets when the doors are in the elevated position, and being proportioned for extension into complemental receipt within said pin sockets when so aligned; and,
(c) means to selectively extend the pins into the pin sockets.

12. A frame according to claim 11 wherein the pins and pin sockets are tapered for snug complemental engagement upon extension of the pins into the pin sockets.

13. A frame according to claim 10 wherein, for each door, said tension, compression and torsion transmitting means further comprises:
(a) downwardly open sockets mounted on the barrier sections to either side of the door openings, said sockets having recesses formed therein of a generally pyramidical configuration; and,
(b) upwardly extending protrusions mounted on the door panels for receipt within said sockets upon movement of the door panels to the elevated positions, said protrusions having generally pyramidical surfaces complementally engageable with the pyramidical surfaces of the sockets upon such receipt.

14. An improved chassis frame for a wheeled motor vehicle, said frame comprising:
(a) an elongate floor section;
(b) upstanding barrier sections fixed to and extending upwardly from said floor section in longitudinally spaced relationship to one another, said barrier section defining therebetween door openings on either side of the frame and having outwardly convex curvilinear side portions extending laterally outwardly relative to the floor section; and,
(c) rigid tension, compression and torsion resistent door panels complemental in shape to the curvilinear side portions of the barrier sections and proportioned for receipt in the door openings;

(d) means mounting said door panels between the curvilinear side portions of the barrier sections for movement between elevated positions extending across said openings and retracted positions removed from said openings and stowed beneath the floor sections of the frame;

(e) means to selectively move said door panels between the elevated and retracted positions; and, (f) tension, compression and torsion transmitting means on said barrier sections and door panels for complemental engagement when the door panels are in the elevated positions to impart rigidity to the frame, said transmitting means comprising:

(1) pin sockets on the curvilinear side portions of the barrier sections, said sockets extending longitudinally of the frame and opening toward the door openings;

(2) selectively extensible pins on the door panels, each of said pins extending longitudinally of the frame for alignment with one of said pin sockets when the doors are in the elevated position, and being proportioned for extension into complemental receipt within said pin sockets when so aligned; and, (3) means to selectively extend the pins into the pin sockets to lock the door panels in the elevated position;

(4) downwardly open sockets mounted on the barrier sections to either side of the door openings, said sockets having recesses formed therein of at least a partially pyramidical configuration;

(5) upwardly extending protrusions mounted on the door panels for receipt within said sockets upon movement of the door panels to the elevated positions, said protrusions having at least a partially pyramidical surface complementally engageable with said configuration of the sockets upon such receipt;

(6) a floor channel formed on the floor section at the bottom of each door opening, each floor channel extending generally across the bottom of the door opening thereabove and downwardly from the floor section and being open in a direction facing inwardly of the frame; and, (7) a door channel formed on the bottom of each door panel, each door channel extending generally across the bottom of the door panel on which it is formed and upwardly from the door panel and being open in a direction facing outwardly of the frame; and wherein, (8) said floor and door channels are complementally engageable upon movement of the door panels to the elevated positions.

15. A frame according to claim 14 wherein each floor channel forms a recess of at least a partially pyramidical configuration and each door channel forms a flange of at least a partially pyramidical configuration, said recesses and flanges complementally engaging upon movement of the door panels to the elevated positions.

16. A frame according to claim 14 wherein said tension, compression and torsion transmitting means further comprises mutually engageable inclined surfaces formed on the ends of the door and floor channels for complemental engagement upon movement of the door panels to the elevated positions.

* * * * *

UNITED STATES PATENT AND TRADEMARK OFFICE
CERTIFICATE OF CORRECTION

PATENT NO. : 4,940,282

DATED : July 10, 1990

INVENTOR(S) : JOHN A. TOWNSEND

It is certified that error appears in the above - identified patent and that said Letters Patent is hereby corrected as shown below:

In Col. 8, Claim 11, line 4, change "barriers" to --barrier--.

Signed and Sealed this

Twenty-third Day of March, 1993

*Attest:*

STEPHEN G. KUNIN

*Attesting Officer*  *Acting Commissioner of Patents and Trademarks*